Dec. 24, 1935.   J. T. QUIGG   2,025,474
SHINGLE SAWING MACHINE
Filed Jan. 22, 1935   2 Sheets-Sheet 1
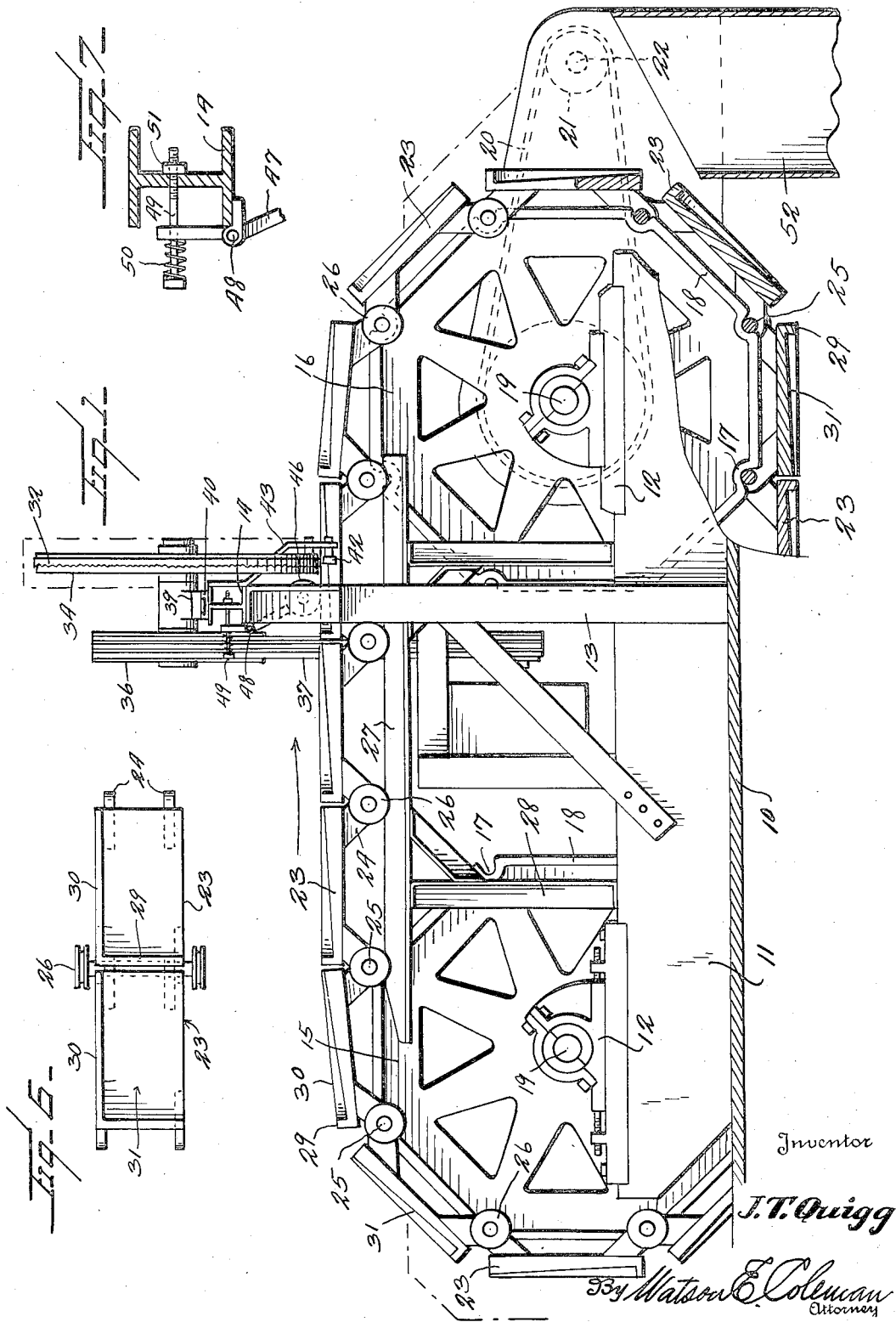
Inventor
J. T. Quigg
By Watson E. Coleman
Attorney Dec. 24, 1935.  J. T. QUIGG  2,025,474
SHINGLE SAWING MACHINE
Filed Jan. 22, 1935  2 Sheets-Sheet 2
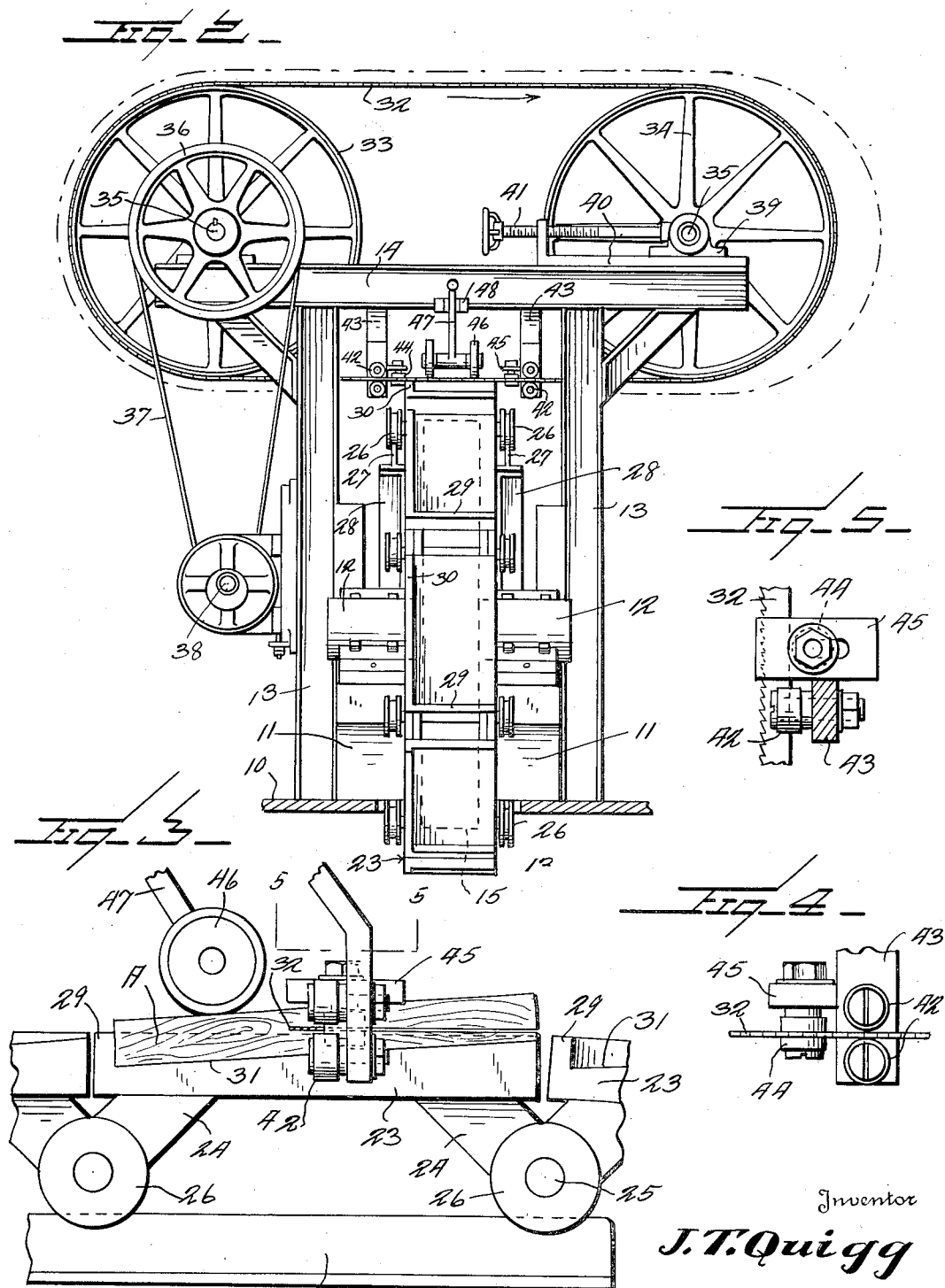
Inventor
J. T. Quigg
By Watson E. Coleman
Attorney Patented Dec. 24, 1935

2,025,474

UNITED STATES PATENT OFFICE 2,025,474

SHINGLE SAWING MACHINE

James T. Quigg, Hoquiam, Wash.

Application January 22, 1935, Serial No. 2,969

3 Claims. (Cl. 143—10)

This invention relates to means for sawing shingles and the general object of the invention is to provide a machine which will turn out by sawing a "shake" or shingle of the same character as if made by splitting.

Split shingles or "shakes" are far superior to those made by a circular saw as the grooves made by splitting along the grain of the wood act to carry the water straight down the shingle. Where the shingle is sawed by a circular saw slight grooves are made which extend transversely of the shingle and the water follows these grooves to the lateral edges of the shingle. Tapered split shingles or "shakes" have been made for years by splitting a blank of wood and then tapering the shingles thus cut off by means of draw knives or by planing, thus causing a great waste of material. In view of these facts, a further object of my invention is to provide a sawing machine which will make two tapered shingles from a single blank, the blank having approximately the same amount of material as would be used in forming one split shingle.

A further object is to provide a mechanism of this character including means for carrying the blanks in a single direction across the path of travel of a transversely operating band saw and supporting these blanks in such a manner that the saw will cut diagonally through the blanks, thus forming two tapered shingles from a single blank of uniform thickness throughout.

A further object is to provide a mechanism of this character in which a chain of blank carriers is used, the chain being driven by power across the path of travel of a band saw, each carrier being formed with a blank seat or recess which is deeper at one end than at the other so that the horizontally moving flight of the band saw will cut the blank in half but in a plane diagonal to the planes of the upper and lower faces of the blank.

Other objects have to do with the details of construction and arrangement of parts as will appear more fully hereinafter.

My invention is illustrated in the accompanying drawings wherein:—

Figure 1 is a side elevation partly in section of a shingle cutting machine constructed in accordance with my invention.

Figure 2 is an end elevation of the machine.

Figure 3 is a detail side elevation of one of the blank carriers showing the saw guides and the means for holding down the blank in place while it is being sawed.

Figure 4 is a detail elevation of one of the saw guides and a portion of the band saw.

Figure 5 is a section on the line 5—5 of Figure 3.

Figure 6 is a top plan view of two of the carriers.

Figure 7 is a side elevation of the means for exerting tension on the hold-down roller, the supporting frame being in section.

Referring to these drawings, 10 designates a base plate of any suitable character and 11 longitudinal beams upon which the bearings 12 are supported. Extending upward from this base plate are the vertical supporting beams 13 connected by a transverse supporting beam 15 which extends across the tops of the uprights 13.

Mounted in the bearings 12 are the octagonal sprocket wheels 15 and 16. These wheels have the same general character. The periphery of each of these wheels is formed at spaced intervals with recesses 17 disposed at the junction of the angularly related flat faces 18. The shaft 19 of the wheel 16 may be considered to be the driving shaft and, as illustrated in Figure 1, is connected by a sprocket chain 20 or other suitable means to a like sprocket wheel 21 on a shaft 22. This shaft 22 is connected to any suitable source of power, this forming no part of my particular invention. The wheels 15 and 16 move in a clockwise direction in Figure 1.

Mounted for movement with the wheels 15 and 16 is an endless chain of carriers, each carrier being designated 23. These carriers, as illustrated, have downwardly and outwardly extending legs 24 connected to each other by transverse pivot pins 25, these pivot pins carrying the grooved wheels 26. The pivot pins 25, therefore, constitute axles for these wheels 26. Supported above the beams 11 and extending parallel therewith in a horizontal plane are the rails 27. These are shown as being supported upon uprights 28 extending upward from the beams 11, the rails 27 being braced from these uprights in any suitable manner. The rails 27 are T-shaped in cross section. As the endless chain composed of the carriers 23 passes upward and around the wheel 15, the wheels 26 engage the beveled end of the rails 27 and these rails 27, therefore, act to support the upper flight of the endless chain composed of the carriers in a horizontal plane and against any downward movement until after each carrier has passed beyond the band saw which will be later described.

Each carrier, as shown best in Figures 3 and 6, is rectangular in form and the upper face of each carrier is extended downward and rearward on a slight inclination from the extreme forward edge of the carrier nearly to the rear thereof. At the rear end the carrier is formed with an upwardly extending wall or flange 29 and one side of the carrier is formed with an upwardly extending wall 30. Thus the shingle blank, which is of even thickness throughout its length, when disposed upon the carrier rests within the seat formed by the inclined bottom face 31 and by the walls 29 and 30. Under these circumstances, as shown in Figure 3, the blank is supported with its forward edge raised considerably above the level of the carrier while its rear edge extends down into the carrier to a considerable distance, thus the blank is supported at an inclination to a horizontal plane.

Extending across the path of travel of the upper flight of the carriers is a band saw 32 which passes over the band wheels 33 and 34. These wheels are carried upon shafts 35 mounted in suitable bearings carried by the beam 14 and the shaft of band wheel 33 carries upon it the pulley 36 which is driven by a rope drive 37 from a motor shaft or line shaft 38. This driving shaft 38 may be mounted in any suitable manner upon the side of one of the beams or uprights 13 and I have not attempted to show any specific driving means for this purpose. Means should be provided, of course, whereby the rope drive 37 may be tightened from time to time. The shaft 35 of the band wheel 34 is shown as mounted on bearings 39 slidably mounted on a track 40 and shiftable to tighten the saw 32 by means of the screw 41. The saw moves in the direction of the arrow of Figure 2 and thus the lower flight of the saw will move across the upper face of a carrier toward the wall 30, the wall 30 thus acting to prevent the shingle from being pulled off the carrier. The saw 32 is guided as it passes across the upper face of the carrier and through the shingle blank by means of the opposed rollers 42 supported upon a bracket 43. This bracket also carries upon it the roller 44 which bears against the back of the saw, this roller being adjustably mounted upon a plate 45 carried by the bracket 43, as shown in Figure 5.

For the purpose of holding down the work, that is, the blank A, I provide a pair of rollers or wheels 46 which are disposed so as to engage against the upper face of the blank A adjacent the wall or flange 29 of the carrier. These rollers are mounted upon an arm 47 pivoted at 48 upon the beam 14, each arm 47 being extended upward beyond the pivot 48 and having an aperture through which a tension bolt 49 passes, as shown in Figure 7, this tension bolt passing through the beam 14 and having at one end a head between which head and the arm 47 a compression spring 50 is disposed. The other end of the bolt 49 carries the nut 51 whereby the spring may be tensioned to any desired degree in order to hold the wheels 46 firmly but yieldingly against the upper face of the blank as the blank travels through the saw. Preferably the wheel 46 has a rubber or other soft faced rim so as not to mar the shingle blank.

In the operation of this mechanism the workman stands at the left hand end of the machine, as shown in Figure 1, and feeds the shingle blanks to the carriers as they move upward toward the beginning of the tracks 27. As soon as the carriers have moved onto the tracks 27 they are held for movement in a horizontal plane and moved toward the hold-down rollers 46 which act to force the blank firmly into place within the seat formed by the flanges 29 and 30 of the carrier. The lower flight of the saw 32 is disposed in a plane just above the upper edges of the walls 29 and 30 and, therefore, cuts through the upwardly inclined blank in a horizontal plane as shown in Figure 3, cutting the blank into two reversely tapered sections. After the carrier has moved on beyond the track 27, it commences to move downward over the wheel 16 and eventually the two shingles cut from the blank will slide off the carrier and be deposited in the chute 52 from which the cut shingles may be directed to any suitable point. It will be seen that I have provided blank carriers of such form that the shingle is held firmly against movement with the saw and firmly for movement with the carrier as the saw cuts through the blank and further that the blanks are held firmly in place within the seats formed in the carriers while the blank is being sawed. This mechanism provides means whereby shingle blanks may be readily cut to form two tapering shingles from a blank which as treated ordinarily would only provide one shingle. The blank is evenly cut so that there are no grooves formed in the face of the shingle which grooves are ordinarily formed where circular saws are used so that the faces of the shingle are like the faces of a split shingle or "shake". Only large straight grain timber would be used for forming shingles in this machine and, therefore, in actual operation the machine would be run in connection with a regular shingle sawing machine which would utilize the less perfect timber.

While I have described my shingle sawing machine as being fed by hand, it is to be understood that it might be fed from a regular stack loader.

While I have illustrated certain details of construction and arrangement of parts, I wish it understood that these might be varied in many ways without departing from the spirit of the invention as defined in the appended claims.

What is claimed is:—

1. A machine for cutting shingles including longitudinal supporting beams, a pair of sprocket wheels mounted thereon in alinement with each other, a pair of horizontally extending track rails mounted upon the supporting beams and level with the uppermost portion of the sprocket wheels, an endless chain of carriers mounted upon the sprocket wheels, the carriers having inwardly extending legs, pivot pins pivotally connecting the said legs and carrying grooved wheels adapted to engage said track rails as the carriers pass off of one sprocket wheel, each of said carriers having a downwardly and rearwardly inclined upper face, a rear guard wall and a side guard wall whereby to form a seat for a shingle blank, means for driving the sprocket wheels, uprights extending upward on each side of said supporting beam and connected by a transverse beam above the upper flight of the carriers, band saw wheels mounted upon said transverse beam, a band saw carried thereby and traveling transversely of the path of movement of the carriers and just above the upper edges of the guard walls thereof, guides for the band saw disposed on each side of the path of movement of the carriers and hold-down wheels disposed in advance of the band saw and just above the path of movement of the carriers, an arm pivotally mounted upon the transverse beam and supporting said wheels, and resilient means urging the said arm downward.

2. A machine for cutting shingles including a supporting frame, a pair of sprocket wheels mounted thereon in alinement with each other, a pair of horizontally extending track rails mounted upon the supporting frame at a level with the uppermost portions of the sprocket wheels, an endless chain of carriers engaging the sprocket wheels, pivot pins pivotally connecting the said carriers to each other and carrying grooved wheels adapted to engage said track rails as the carriers pass off of one sprocket wheel, each of said carriers having a downwardly and rearwardly inclined upper face, a rear guard wall and a side guard wall whereby to form a seat for a shingle blank, means for driving the sprocket wheels, band saw wheels mounted upon the supporting frame above the upper flight of the carriers, a band saw carried thereby and traveling transversely of the path of movement of the carriers and just above the upper edges of the guard walls thereof, guides for the band saw disposed on each side of the path of movement of the carriers, hold-down wheels disposed in advance of the band saw and just above the path of movement of the carriers, and resilient means urging said wheels downward.

3. A machine for cutting shingles including longitudinally extending supporting beams, a pair of sprocket wheels mounted thereon in alinement with each other, a pair of horizontally extending track rails mounted upon the supporting beams and level with the uppermost portion of the sprocket wheels, an endless chain of carriers mounted upon the sprocket wheels, pivot pins pivotally connecting said carriers and having grooved wheels adapted to engage said track rails as the carriers pass off of one sprocket wheel, each of said carriers having a downwardly and rearwardly inclined upper face and having guard walls forming a seat for a shingle blank, means for driving the sprocket wheels, uprights extending upward on each side of the said supporting beam and connected by a transverse beam above the upper flight of the carriers, band saw wheels mounted upon said transverse beam, a band saw carried thereby and having its lower flight disposed just above the upper edges of the guard walls of the carriers, brackets extending downward from the transverse beam and carrying rollers constituting guides for the saw and disposed on each side of the path of movement of the carriers and downwardly urged hold-down wheels disposed in advance of the band saw and just above the path of movement of the carriers.

JAMES T. QUIGG.